3,076,780
PUNK RESISTANT, POWDERED BINDER COMPOSITIONS COMPRISING A PHENOLIC NOVOLAC AND A POLYMERIC CONDENSATION PRODUCT OF AN ALKYL ETHER OF DIMETHYLOL UREA, AND MINERAL FIBERS BONDED THEREWITH
Bruce P. Barth, Bound Brook, N.J., assignor to Union Carbide Corporation, a corporation of New York
No Drawing. Filed Dec. 24, 1959, Ser. No. 861,736
12 Claims. (Cl. 260—45.1)

This invention relates to punk resistant, powdered binder compositions. More particularly, the invention relates to phenolic novolac resin-containing powdered binder compositions which are useful and advantageous as nonpunking binders in mineral wool insulation batts, acoustical tile, textile fiber cushion batting and the like.

Thermal insulation batts, acoustical tile and similar structures generally comprise glass wool, rock wool or other mineral fibers held together by a resinous binder, present in amounts of about 5 to 20 percent by weight to impart strength and resiliency to the structure and preserve original insulating, acoustical, dimensional and other properties.

The powdered resin binders currently known and used by the art are not sufficiently combustion resistant. The introduction of a hot rivet or slug of hot glass or similar heated object into the batt or other structure, or conduction of heat from an adjacent object, such as a high pressure steam pipe, can initiate in most known binder compositions a highly exothermic combustion which propagates itself through the batt or like structure, gradually consuming the resinous binder, leaving a fine, white, powdery ash. The smoldering or slow, flameless burning is termed "punking."

The temperatures caused by a punking reaction are ordinarily not sufficient to ignite the fibers forming the batt, but readily combustible material found almost invariably in the vicinity of the punking reaction will likely become ignited. For example, wooden walls and paint on various surfaces, including metal surfaces, have been ignited by punking occurring proximate thereto and disastrous fires have resulted. Punking-type combustion is especially pernicious since it can continue unnoticed and is so easily initiated, e.g. in ships by the use of hot rivets during repair, in buildings by a break in electrical wiring passing through an insulating batt or in batts stored in boxcars and warehouses from a latent hot slug of glass in the finished batt itself.

Nonpunking resins are known, but are unsuited for insulation batts and like structures, either because of prohibitive cost, as in the case of melamine resins, or poor final properties, especially lack of water resistance. A resin having good nonpunking properties is a dicyandiamide-formaldehyde resin, but this advantage does not outweigh undesirable factors such as high cost and poor water resistance.

Nonpunking binder compositions have heretofore been obtained chiefly by the use, in conjunction with phenolic novolac resin, of a urea or a urea-formaldehyde resin in sufficient quantity to provide about 15% by weight nitrogen based on total resin solids in the binder composition. These nonpunking compositions have been produced in various ways, such as simultaneous reaction of phenol, urea, and formaldehyde; reaction of phenol alcohols and urea; reaction of phenols and methylol ureas; and combinations of the foregoing.

It is well known that cured urea-formaldehyde resins have poor water resistance. Hence, cured binder systems having a significant urea-formaldehyde resin content are, to the extent of that content vulnerable to attack by water. When a binder mixture comprising a urea-formaldehyde resin and either a phenol or a phenolic resin is cured, little or no inter-reaction occurs between the urea resin and the phenol or the phenolic resin. This is because the reactivity of a urea resin molecule toward any other urea or urea resin molecules present is much greater than its reactivity towards a phenol or a phenolic resin. As a result, urea self-reaction or "homopolymerization" proceeds so quickly as to virtually exclude urea resin-phenol or -phenolic resin inter-reaction or "copolymerization." The cured product, therefore, is a mixture predominantly containing cured urea resin (homopolymer) and phenol, or cured phenolic resin (homopolymer) and very little, quite possibly no urea-phenolic inter-reaction product copolymer). The presence of urea resin (homopolymer) is believed responsible in large measure for the poor water resistance properties characteristic of heretofore known nonpunking binder compositions.

It is clear from the foregoing that the art has not been able to obtain in various mineral fiber structures, such as insulation batts, acoustical tile and cushion batting, the advantages of punking resistance, good bonding behavior and a fair degree of water resistance simultaneously, but has had, heretofore, to compromise one or more of these desirable properties.

It is an object, therefore, of the present invention to provide a powdered phenolic novolac resin containing binder for mineral fibers which is simultaneously punking resistant, water resistant and strong.

It is another object to provide a powdered phenolic novolac resin containing binder composition which is heat curable to a nonpunking, water resistant bond of excellent strength.

It is a further object to provide a solid, powdered or grindable thermosetting resin composition useful in a variety of applications.

In general these and other objects of the invention are achieved with a heat curable composition comprising a blend of a solid, friable phenolic novolac resin and a solid, friable heat reaction product of a lower alkyl ether of dimethylol urea with itself or mononuclear phenols. These compositions are heat curable powders, that is, heating the compositions to an elevated temperature causes the fusion of individual particles of the powder and cross-linking between constituent molecules to form a three-dimensional network and provides an infusible, thermoset resin which is nonpunking and water resistant.

The advantages of the heat curable composition include good aging characteristics, dependable bonding performance, excellent resistance to punking and good water resistance. Further, the blends are lighter in color than unmodified phenolic resins.

As used herein the terms "friable" and "grindable" are synonomous both referring to a characteristic property of the blends of this invention and of each of its components to be able to be pulverized, ground or otherwise reduced in size by mechanical action without sintering. The property is essential in forming powdery masses of binder useful in binding glass wool or other mineral fiber in batts and like structures.

The solid, friable, phenolic resins useful in the present invention are acid-catalyzed phenolic novolac resins well known to the art such as are described in U.S. Patents 2,585,196 to Walton; 2,475,587 to Bender et al.; 2,557,922 to Mazzucchelli et al.; 2,617,785 to Pritchett et al. and 2,552,025 to Barr et al. Suitable novolacs have melting points sufficiently high to avoid sintering upon pulverization or grinding by conventional mechanical means. In general the novolac resins are prepared by reaction to the formation of solid, friable reaction products of from 0.5 to 1.0 mole of formaldehyde in any of its commercial forms, such a paraform or formalin with one mole of a phenol, preferably in the presence of an acid catalyst, such as a mineral acid e.g. sulfuric acid or an organic acid e.g. oxalic acid. If desired, the catalyst can be partially or wholly neutralized with an inorganic or organic hydroxide upon completion of the reaction.

The solid, friable heat reaction products made using lower alkyl ethers of dimethylol urea which are useful in the blends of this invention are:

(A) The solid, friable homopolymeric self-condensation reaction products of monomethyl, monoethyl, dimethyl or diethyl ethers of dimethylol ureas with themselves or with one another and, (B) The solid, friable copolymeric condensation reaction products of monomethyl, monoethyl, dimethyl or diethyl ethers of dimethylol ureas with mononuclear phenols. The term "an alkyl ether of dimethylol urea" as used herein is intended to include both the monoalkyl ethers of dimethylol urea and the dialkyl ethers of dimethylol urea wherein the alkyl group or groups contain from 1 to 2 carbon atoms, inclusive.

The homopolymeric, self-condensation reaction products of the lower alkyl ethers of dimethylol urea can be prepared by heating the ether in the presence of, or preferably in the absence of water until a solid, grindable resin product is achieved. These homopolymeric self-condensation reaction products sometimes exhibit a tendency to sinter when pulverized, hence care should be taken in reducing these products to a powdered state.

The copolymeric condensation reaction product of lower alkyl ethers of dimethylol urea with phenols are solid, grindable resinous materials produced as described in the copending application of B. P. Barth and A. K. Ingberman Serial No. 861,738, filed December 24, 1959. In general, the copolymeric products are prepared by heating a reaction mixture comprising one mole of a mononuclear phenol having at least two replaceable hydrogen atoms in the ring positions other than the meta to the phenolic hydroxyl, that is, at least two replaceable hydrogen atoms in the ortho positions, or one hydrogen in each of the ortho and para positions to the phenolic hydroxyl and from 0.5 mole to 6.0 moles of a lower alkyl ether of dimethylol urea suitably under reflux conditions. The phenol employed in forming the copolymeric reaction product can be a mixture of mononuclear phenols including some not having two replaceable hydrogen atoms in the ring positions ortho and/or para to the phenolic hydroxyl, provided the predominant phenol present has at least two replaceable hydrogen atoms in the ring positions ortho and/or para to the phenolic hydroxyl and cross-linking and formation of a three dimensional network of molecules is possible.

Heating above room temperature is necessary to carry out the reaction with reflux temperatures at atmospheric pressure, which facilitate removal of the methanol of condensation, being preferred. A preferred copolymer is prepared by heating together and condensing from one to three moles of the dimethyl or diethyl ether of dimethylol urea with one mole of a mononuclear phenol having two replaceable hydrogen atoms in ring positions ortho and/or para to the phenolic hydroxyl at a temperature of 110° C. to 150° C. and a pH between about 7 and 12 for one-half to six hours or longer. Use of a pH below about 7 is not generally desirable, although a slightly faster rate of reaction is obtained, since the copolymeric product is so highly resinous as to be inconvenient to remove from the reaction equipment. The final product is a brittle, grindable copolymeric resin containing only about 3 to 12% by weight unreacted phenol.

The blends of this invention are prepared by intermixing a solid, powdered, or grindable novolac with a solid, powdered, or grindable heat reaction product prepared as described above from an alkyl ether of dimethylol urea alone or with a phenol. Pulverization of the components can be carried out separately, followed by mixing, or mixing can be accomplished by pulverizing the resins together. All that is required in the mixing is the obtaining of a fairly homogeneous mass of particulated resin comprising intimately interdispersed a novolac and a homopolymeric and/or copolymeric heat reaction product of the alkyl ethers of dimethylol urea.

The amount of homopolymeric and/or copolymeric heat reaction product of ethers of dimethylol urea present in blends of the invention with respect to the novolac present is not narrowly critical with virtually any ratio providing correspondingly modified properties. Improvement in punking resistance is obtained in blends containing as little as 25 parts by weight of the homopolymer or copolymer of the alkyl ether of dimethylol urea per 100 parts by weight of the blend. Use of up to 90 parts by weight of the reaction products of the ether provides punking resistance without a significant alteration in the water resistance of the bond as compared with a 100% novolac bond. Above about 90 parts the water resistance is affected, but where this property is not critical even greater amounts can be employed with the novolac. It is preferred to employ over 40 parts by weight of the alkyl ether of dimethylol urea condensation product per 100 parts by weight of the blend. It is particularly preferred to employ over 60 parts by weight of the copolymeric condensation product per 100 parts of the blend especially when using a copolymer having a relatively low phenol content e.g. a three to one ratio of alkyl ether of dimethylol urea to phenol copolymer because the novolac acts as an additional curing agent with such copolymers speeding up rate of cure and improving final bond strength.

The products obtained with the above-described blends are useful because of their desirable combination of good water resistance, adequate strength and resistance to punking. While not desiring to be bound to any particular theory, it is believed that the improvement in properties exhibited by the blends of this invention which contain about 15% or more of nitrogen and are hence punk resistant but are nonetheless water resistant as compared with previously known nitrogen-containing binder resins is in large measure attributable to the decreased reactivity, with respect to homopolymerization, of the alkyl ethers of dimethylol ureas. In contrast to the conventionally used ureas, ether-terminated dimethylol ureas auto-condense more slowly than they react with an active ortho and/or para hydrogen atom of a phenol or a phenolic resin. Consequently a high degree of inter-reaction and copolymerization of the etherfied dimethylol urea with the phenol or phenolic resin takes place. The resultant copolymer in which the ureidic and phenolic structures are bound together in the same molecule has good water resistance.

The following examples are present to illustrate the practice of the present invention. All parts and percentages are by weight unless otherwise indicated.

EXAMPLE 1

A. *Preparation of the Dimethyl Ether of Dimethylol Urea*

Two hundred fifty-seven pounds of urea were added over a 29 minute period to a jacketed still cooled by circulating water containing 731 pounds of 37% formalin and 4000 grams of 25% sodium hydroxide. The temperature rose to 42° C. in three minutes and then subsided to room temperature. Reaction was continued for 61 minutes, after which 515 pounds of methanol and 1643 gram of sulfuric acid (pH 3.3) were added. The mixture was agitated for 30 minutes, then neutralized to a pH of 7.2. Distillation was carried out under vacuum until a temperature of 100° C. at 26 mm. pressure was reached.

B. *Preparation of the Copolymer*

To the product of the above reaction was added 940 pounds of phenol, making the molar ratio of dimethyl ether of dimethylol urea to phenol 3 to 1. Heating was initiated. After 22 minutes, a temperature of 140° C. at atmospheric pressure was reached. Heating to a temperature between 140–148° C. was continued for 59 minutes. The product was then discharged into a cooler consisting of parallel steel plates cooled by interiorly circulating water. The cooled product was brittle and grindable. Yield of copolymer was 517 pounds.

The copolymer product was tested for free phenol content by the Koppeschaar method employing steam distillation and bromination of phenol. Free phenol content was 4.09%. The melting point of the copolymer was 76° C. The copolymer had a viscosity, measured as a 35% solution in a 67% acetone, 33% water mixture of 10.5 centistokes. Gel time of the copolymer was determined by a stroke cure test. A one gram sample of the copolymer was placed on a hot plate heated to 150° C. and stroked with a spatula once per second and the stringing of the resin from the spatula noted. When the stringing ceased the number of seconds elapsed since the test was started was recorded as the stroke cure time. Stroke cure time for the above prepared copolymer was 150 seconds.

The copolymer made above was blended with a grindable phenolic resole novolac having an average chain length of about six units, prepared from 72 parts 37% formalin and 100 parts phenol reacted at atmospheric reflux using an organic acid catalyst to the substantially complete consumption of $CH_2O$ and dehydrated to 150° C. pot temperature. The ratio of the components in the blend was 60 parts copolymer to 40 parts novolac. The blend had a melting point of 68° C. and a stroke cure time of 64 seconds. To determine strength and water resistance properties, the blends were used in molding tensile test specimens. The blend was dissolved in Cellosolve to a 50% solution. Eighty grams of the solution was added to 800 grams of Wedron 60, testing sand and mixed therewith for 7 minutes in a Kitchen Aid mixer. Three inch by one-half inch "dog bone" samples were made by pounding 55 grams of the mixture into a split mold. Samples were cured for 15 minutes at 500° F. When cooled, the samples were tested for tensile strength in a Tinius-Olsen testing machine with a jaw separation speed of ¼" per minute, both dry and after soaking in 72° F. water for 24 hours. The results of the tests were:

Tensile strength—
  Dry _____ 640 pounds/sq. in.
  After soaking _____ 558 pounds/sq. in.
  Percent strength retention _____ 87%.
Nitrogen content (assuming complete cure) _____ 14%.

EXAMPLE 2

The procedure, copolymer and novolac of Example 1 were used, but with a blend having an 80/20 ratio of copolymer to novolac. Results were as follows:

Tensile strength—
  Dry _____ 720 pounds/sq. in.
  After soaking _____ 659 pounds/sq. in.
  Percent strength retention _____ 91%.
Nitrogen content (assuming complete cure) _____ 19%.

The products of this invention are useful in batt binder compositions, and can include conventional fillers, additives, modifiers, extenders and the like. Other uses for the compositions comprising the above-described blends include use as a molding material, or an abrasive in polishing pastes and the like.

What is claimed is:

1. A solid powdered heat-curable composition useful as a binder for mineral fiber-containing structures comprising a blend for an acid-catalyzed solid grindable phenolic novolac and a solid, grindable condensation reaction product selected from the group consisting of homopolymeric condensation reaction products of alkyl ethers of dimethylol urea wherein each alkyl group has from one to two carbon atoms inclusive and copolymeric condensation reaction products of alkyl ethers of dimethylol urea wherein each alkyl group contains from one to two carbon atoms inclusive with a mononuclear phenol having at least two replaceable hydrogen atoms in ring positions other than meta to the phenolic hydroxyl.

2. A solid powdered heat-curable composition useful as a binder for mineral fiber-containing structures comprising a blend of an acid-catalyzed, solid grindable phenolic novolac and a solid grindable homopolymeric self-condensation reaction product of alkyl ethers of dimethylol urea wherein the alkyl groups have from 1 to 2 carbon atoms inclusive.

3. A solid powdered heat-curable composition useful as a binder for mineral fiber-containing structures comprising a blend of an acid-catalyzed solid grindable phenolic novolac and a solid grindable copolymeric condensation reaction product of an alkyl ether of dimethylol urea wherein each alkyl group has from 1 to 2 carbon atoms inclusive and a mononuclear phenol having at least two replaceable hydrogen atoms thereon in ring positions other than meta to the phenolic hydroxyl.

4. The composition of claim 2 wherein the alkyl ether of dimethylol urea is diethyl ether of dimethylol urea.

5. The composition of claim 2 wherein the alkyl ether of dimethylol urea is dimethyl ether of dimethylol urea.

6. The composition of claim 3 wherein the alkyl ether of dimethylol urea is diethyl ether of dimethylol urea.

7. The composition of claim 3 wherein the alkyl ether of dimethylol urea is dimethyl ether of dimethylol urea.

8. A solid powdered heat-curable composition useful as a binder for mineral fiber-containing structures comprising per 100 parts by weight, from 10 to 75 parts by weight of an acid-catalyzed solid grindable phenolic novolac blended with from 90 to 25 parts by weight of a solid grindable condensation reaction product selected from the group consisting of homopolymeric condensation reaction products of alkyl ethers of dimethylol urea wherein each alkyl group has from one to two carbon atoms inclusive and copolymeric condensation reaction products of alkyl ethers of dimethylol urea wherein each alkyl group contains from one to two carbon atoms inclusive with a mononuclear phenol having at least two replaceable hydrogen atoms in ring positions other than meta to the phenolic hydroxyl.

9. A solid powdered heat-curable composition useful as a binder for mineral fiber-containing structures comprising per 100 parts by weight thereof up to 60 parts by weight of an acid-catalyzed solid grindable phenolic novolac blended with at least 40 parts by weight of a condensation reaction product selected from the group consisting of homopolymeric condensation reaction products of alkyl ethers of dimethylol urea wherein each alkyl group has from one to two carbon atoms inclusive and copolymeric condensation reaction products of alkyl ethers of dimethylol urea wherein each alkyl group contains from one to two carbon atoms inclusive with a mononuclear phenol having at least two replaceable hydrogen atoms in ring positions other than meta to the phenolic hydroxyl.

10. The composition of claim 3 wherein the copolymeric condensation reaction product is the reaction product of the mononuclear phenol and 3 moles of alkyl ether of dimethylol urea wherein each alkyl group has from 1 to 2 carbon atoms inclusive per mole of said phenol.

11. A nonpunking bonding composition produced by curing a blend of an acid-catalyzed solid grindable phenolic novolac and a solid grindable condensation reaction product selected from the group consisting of homopolymeric condensation reaction products of alkyl ethers of dimethylol urea wherein each alkyl group has from one to two carbon atoms inclusive and copolymeric condensation reaction products of alkyl ethers of dimethylol urea wherein each alkyl group contains from one to two carbon atoms inclusive with a mononuclear phenol having at least two replaceable hydrogen atoms in ring positions other than meta to the phenolic hydroxyl, said reaction product being present in an amount of at least 60 parts by weight per 100 parts by weight of said composition.

12. An insulation batt comprising mineral fibers bonded together by the composition claimed in claim 11.

References Cited in the file of this patent

UNITED STATES PATENTS

| | | |
|---|---|---|
| 2,201,914 | Oeffinger et al. | May 21, 1940 |
| 2,604,427 | Armstrong et al. | July 22, 1952 |
| 2,693,460 | Gagliardi | Nov. 2, 1954 |
| 2,915,503 | Vogel | Dec. 1, 1959 |

FOREIGN PATENTS

| | | |
|---|---|---|
| 572,414 | Great Britain | Oct. 8, 1940 |
| 530,432 | Canada | Sept. 18, 1956 |